United States Patent [19]

McNamee

[11] Patent Number: 5,180,223

[45] Date of Patent: Jan. 19, 1993

[54] LOW INTENSITY RV LIGHT

[76] Inventor: Thomas C. McNamee, 2451 Monaco Dr., Oxnard, Calif. 93035

[21] Appl. No.: 876,033

[22] Filed: Apr. 30, 1992

[51] Int. Cl.$^5$ .............................. F21S 3/00
[52] U.S. Cl. ........................ 362/223; 362/61; 362/311
[58] Field of Search ............ 362/223, 368, 311, 61

[56] References Cited

U.S. PATENT DOCUMENTS

| | | | |
|---|---|---|---|
| 2,640,143 | 5/1953 | Malone | 240/2 |
| 4,096,379 | 6/1978 | Taylor | 362/235 |
| 4,178,627 | 12/1979 | Baumann | 362/240 |
| 4,189,709 | 2/1980 | Gosswiller | 362/223 |
| 4,204,274 | 5/1980 | Luderitz | 362/239 |
| 4,285,032 | 8/1981 | Honda et al. | 362/223 |
| 4,477,863 | 9/1984 | Walz | 362/84 |
| 4,600,975 | 7/1986 | Roberts | 362/147 |
| 4,748,545 | 5/1988 | Schmitt | 362/219 |
| 4,901,212 | 2/1990 | Prickett | 362/145 |
| 4,964,022 | 10/1990 | Lane | 362/80 |
| 5,140,216 | 8/1992 | Darr | 362/223 |

Primary Examiner—Carroll B. Dority
Attorney, Agent, or Firm—W. Douglas English

[57] ABSTRACT

A completely portable and simply deployable wide-area low-intensity lighting fixture adapted for removable attachment to an RV awning utility beam, and assembled from a first length of flexible cylinder or tubing for removable insertion into a pre-existing indentation or utility channel in the utility beam, together with a rectangular sheet of flexible sheeting extending laterally from the first length of tubing, and a second length of transparent and flexible tubing connected to the side of the sheeting which is transversely opposite the side attached to the first length of tubing, as well as a collection of relatively uniformly wide-area low-intensity lighting elements disposed within the second length of transparent tubing, resulting in an inexpensively manufacturable and conveniently simply usable wide-area portable lighting system removably attachable to land or marine RVs.

20 Claims, 2 Drawing Sheets

LOW INTENSITY RV LIGHT

BACKGROUND

1. Field of Invention

This invention relates to the field of completely portable and readily deployable and removable, yet conveniently simple, lighting attachments to land or marine recreational vehicles (RVs), enabling relatively uniform wide-area low-intensity illumination and removable attachment anywhere, specifically including the utility beam of typical RV awning fixtures.

2. Description of the Prior Art

The recreational vehicle (RV) industry has witnessed incredible growth throughout the world and, because of many factors including the increasingly large numbers of retired persons, faces the prospect of ever-increasing business. The intent of such vehicles is to enable the consumer to travel freely with as many comforts of a stationary home as possible.

By their very nature, RVs are frequently parked or moored in either a remote area or a location where access to permanently fixed lighting systems is not conveniently available. To fully enjoy the evenings while "camping" in this way, some type of portable illumination is required.

Thus there has been an increasing but unmet need for a portable, storable, inexpensive, conveniently deployable, wide-area illumination system specifically adapted to the convenience of RV users.

Until now, this need has not been met.

In the past all that has been available, toward meeting the stated need, typically consisted of or two small lamps affixed in some manner to the so-called "utility beam" of typical awning attachments to RVs, which provides at most spot-illumination or illumination of a few adjacent spots. However, no simple, conveniently deployable, removably attachable lighting systems suitable for uniform wide-area illumination (such as the patio-like area under an awning) are known to this inventor.

Strictly speaking, then, there is no prior art in the sui generis field created by the present invention.

Granted, it would be an obvious improvement of the presently available lighting fixtures in this context to simply replace the one or two bulbs or lamps or lighting elements now hung from the utility beam by a larger number of lighting elements, thus extending the illuminated area to a larger and more uniformly lighted area adjacent the RV. But nothing in the most closely related prior art suggests combining the presently disclosed structural elements and mode of combination of such known elements into the complete and conveniently useful, removably attachable, readily deployable, inexpensively made, portable apparatus disclosed herein.

A diligent search discloses only somewhat-related or somewhat pertinent inventions, including the following.

One such prior art discloses an illuminated metallic awning, with illuminating means intended for permanent attachment. "Metallic" means, however, in no way suggests the use of flexible materials such as the present invention, and there is no suggestion of application to a movable vehicle instead of a permanent building, much less to a readily deployable, completely portable system such as presently disclosed.

Other prior art suggests a permanently fixed, spotlight-like, bus side light stem mounted on top of a bus, which provides non-uniform illumination of a limited area adjacent a vehicle. Admittedly it would be obvious to adapt this from a bus to an RV, but there is no suggestion that would lead to the readily deployable, removably insertable, uniformly wide-area illuminating, low-intensity, completely portable apparatus disclosed in the present invention.

SUMMARY OF THE INVENTION

Accordingly the reader will see that the completely portable, uniformly wide-area low-intensity illuminating RV attachment of the present invention consisting of a series of flexibly packaged miniature lights can be readily assembled from standard and inexpensively available elements and cheaply manufactured for conveniently simple mass use. Furthermore the attachment has additional advantages in that:

it permits simple manufacture or retrofit of an RV lighting apparatus which is completely portable and easily storable, conveniently deployable and easily removable, readily but removably attachable anywhere upon the surface of an RV, and provides relatively uniform low-intensity illumination over a pre-selected wide area;

it permits simple manufacture of an RV lighting apparatus which consists of inexpensively obtainable standard elements which can be assembled easily into an inexpensively manufacturable and relatively simple apparatus for cheap and convenient mass use.

OBJECTS AND ADVANTAGES

Accordingly, several objects and advantages of the present invention are:

to provide an RV lighting apparatus which is completely portable;

to provide an RV lighting apparatus which is easily deployable;

to provide an RV lighting apparatus which is readily attachable anywhere upon the surface of an RV;

to provide an RV lighting apparatus which is readily but removably attachable;

to provide an RV lighting apparatus which provides relatively uniform illumination over a pre-selected wide area:

to provide an RV lighting apparatus which consists of inexpensively obtainable standard elements which can be assembled easily into an inexpensively manufacturable and relatively simple apparatus for cheap and convenient mass use;

to provide a broad area, low intensity illuminating means adapted for manufacture with or retrofit adaptability in the utility beam/awning roller of a typical RV awning.

DRAWING FIGURES

DESCRIPTION OF A PREFERRED EMBODIMENT

Figure 1:
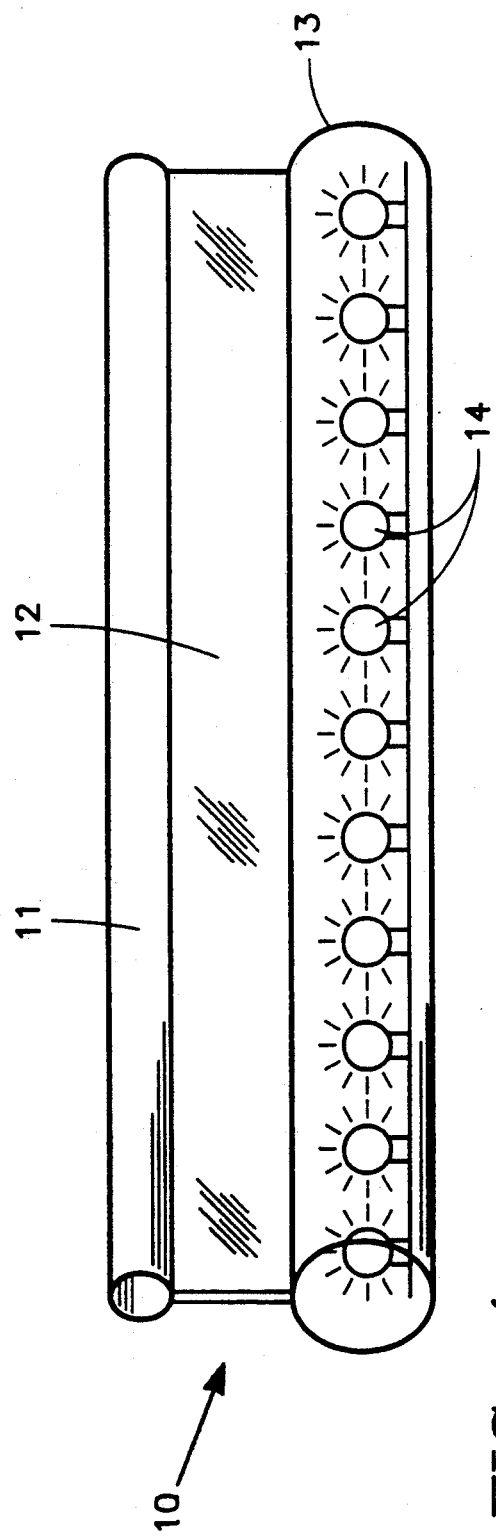
FIG. 1 depicts the basic configuration of the present invention in an external perspective.

Referring now to the Drawing, FIG. 1 illustrates the basic configuration of the presently disclosed lighting fixture 10, consisting of a first length of clear plastic flexible cylinder or tubing 11 from which extends lengthwise clear plastic flexible sheeting 12. A second length of flexible tubing 13, connected to the other side of sheeting 12, contains electrical lighting elements 14, which can either be a plurality of small incandescent or fluorescent lamps connected in series, or possibly a single elongated pliant luminescent or fluorescent tube.

Figure 2:
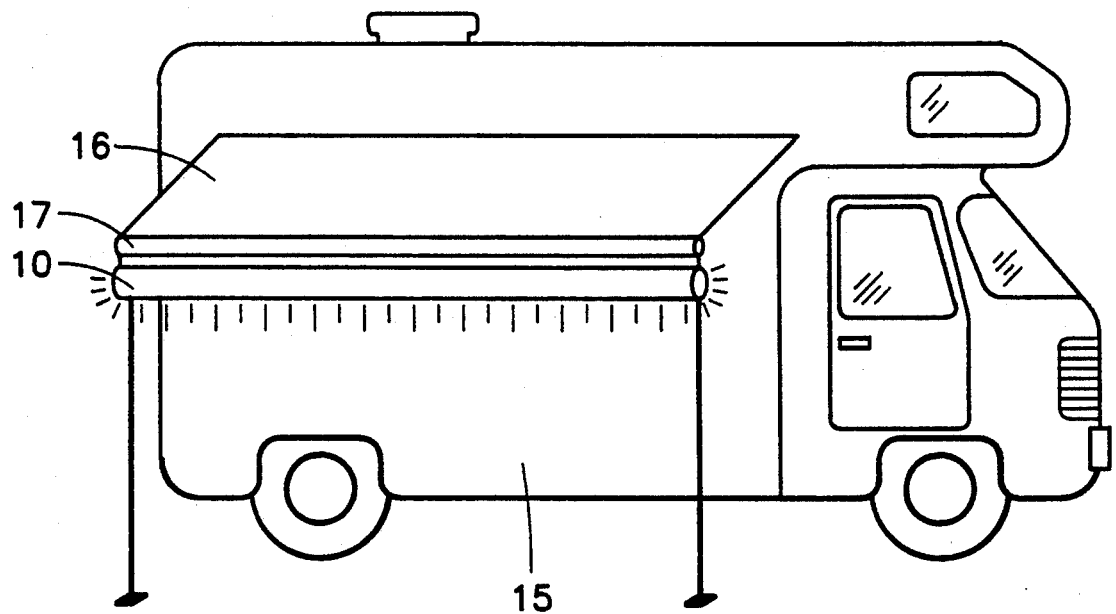
FIG. 2 depicts one preferred use of the present invention, illustrated in an external perspective as applied to a typical land RV's portable awning fixture's utility beam/roller.

FIG. 2 illustrates a preferred use of the lighting fixture An awning 16 is often attached to a recreational vehicle (RV) 15. Such an RV awning typically has what is known as a utility beam 17 from which items may be attached and/or hung. Fixture 10 may be attached along utility beam 17, providing relatively uniform wide-area low-intensity lighting and illumination adjacent the RV 15, such as in the patio-like area underneath awning 16.

Figure 3:
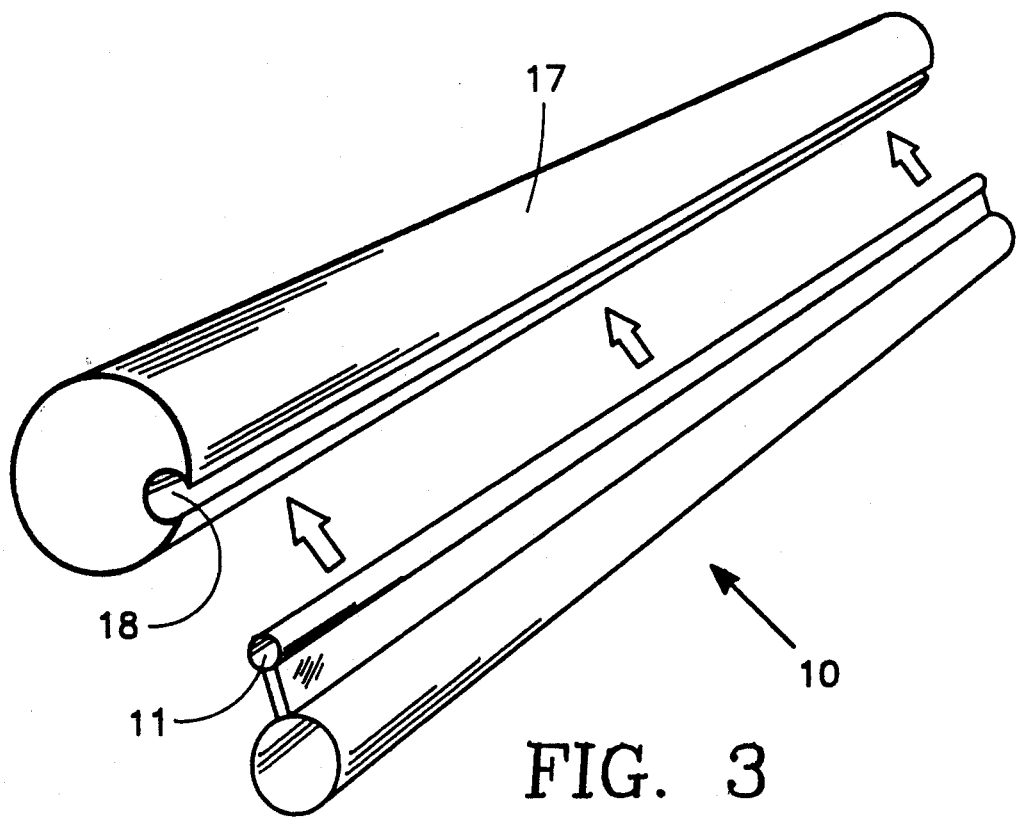
FIG. 3 depicts the utility beam of FIG. 2 in a closer external perspective showing one preferred mode of removable attachment of the present invention to the beam/roller.

FIG. 3 illustrates a closer view of utility beam 17. Such a utility beam will have at least one lengthwise indentation(s) known as the utility channel(s) 18 into which cylinder 11 can be inserted by sliding it into channel 18, thus allowing the fixture 10 to hang down from utility beam 17.

Figure 4:
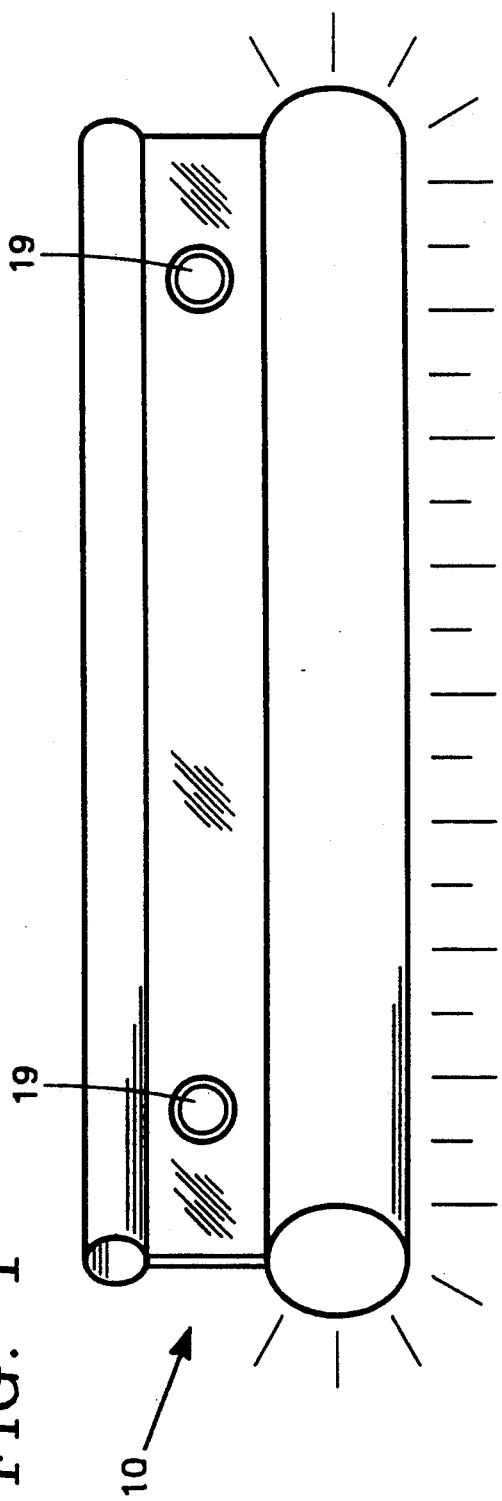
FIG. 4 depicts an alternative or supplementary feature of the present invention, shown in an external perspective, whereby it may be attached by grommets to surfaces other than an RV utility beam/roller.

FIG. 4 demonstrates that lighting fixture 10 can also be freely attached to surfaces other than an RV utility beam 17. One possible means of attachment is achieved by attaching grommet(s) 19 to fixture 10, thereby allowing fixture 10 to be hung from a hook, nail, or other device.

Although the description above contains many specificities, these should not be construed as limiting the scope of the invention but as merely providing illustrations of some of the presently preferred embodiments of this invention. For example, the attachment means could consist of hooks instead of grommets, and for some purposes a single hook or grommet instead of the mentioned plurality of grommets would suffice.

Thus the scope of the invention should be determined by the appended claims and their legal equivalents, rather than by the examples given.

I claim:

1. A portable low intensity, even distribution lighting fixture adapted for simple deployment and removable attachment to an RV awning utility beam, comprising:
    a first length of flexible cylinder or tubing for removable insertion into a pre-existing indentation or utility channel in said utility beam;
    a rectangular sheet of flexible sheeting extending laterally from said first length of tubing;
    a second length of flexible transparent tubing connected to said sheeting's side transversely opposite the side of said sheeting attached to said first length of tubing; and
    low-intensity relatively uniformly wide-area illuminating means disposed within said second length of tubing.

2. The portable lighting fixture of claim 1 wherein said illumination means consists of a plurality of electrical lighting elements in series.

3. The portable lighting fixture of claim 2 wherein said lighting elements are miniature incandescent electrical lights.

4. The portable lighting fixture of claim 2 wherein said lighting elements are fluorescent electrical lights.

5. The portable lighting fixture of claim 1 wherein said illumination means consists of a single elongated luminescent or fluorescent lighting element.

6. The portable lighting fixture of claim 1 improved as to the adaptability of mode of attachment to an RV by addition to said sheeting of at least one grommet enabling attachment to RV features other than awnings.

7. A portable lighting fixture adapted for simple deployment and removable attachment to an RV, comprising:
    a first length of flexible cylinder or tubing;
    a rectangular sheet of flexible sheeting extending laterally from said first length of tubing;
    a second length of flexible transparent tubing connected to said sheeting s side transversely opposite the side of said sheeting attached to said first length of tubing;
    uniformly wide-area illumination means disposed within said second length of tubing;
    attachment means enabling attachment of said fixture to said RV.

8. The portable lighting fixture of claim 7 wherein said illumination means consists of a plurality of electrical lighting elements.

9. The portable lighting fixture of claim 8 wherein said lighting elements are incandescent electrical lights.

10. The portable lighting fixture of claim 8 wherein said lighting elements are fluorescent electrical lights.

11. The portable lighting fixture of claim 7 wherein said illumination means consists of a single elongated luminescent or fluorescent lighting element.

12. The portable lighting fixture of claim 7 wherein said attachment means comprises at least one grommet disposed upon said sheeting.

13. The portable lighting fixture of claim 7 wherein said attachment means comprises adaptation of said first length of tubing for removable insertion into a pre-existing indentation or utility channel in the utility beam of an awning fixture of said RV.

14. A method of assembly of a completely portable wide-area low-intensity illuminating system adapted for simple deployment and removable attachment to an RV, comprising the steps of:
    procuring a selected length of a first length of flexible cylinder of tubing;
    attaching to said first length of tubing a rectangular sheet of flexible sheeting extending laterally for a selected distance from said first length of tubing;
    connecting a second length of transparent flexible tubing to said sheeting's side transversely opposite the side of said sheeting attached to said first length of tubing;
    disposing relatively uniformly wide-area low-intensity lighting means within said second length of tubing;
    including in said system alternative attachment means enabling attachment of said fixture to said RV.

15. The method of claim 14 wherein said illuminating means consists of a plurality of electrical lighting elements in series.

16. The method of claim 15 wherein said lighting elements are incandescent electrical lights.

17. The method of claim 15 wherein said lighting elements are fluorescent electrical lights.

18. The method of claim 14 wherein said lighting means consists of a single elongated luminescent or fluorescent lighting element.

19. The method of claim 14 wherein said attachment means comprises at least one grommet disposed upon said system.

20. The method of claim 14 wherein said attachment means comprises adaptation of said first length of tubing for removable insertion into a pre-existing indentation or utility channel in the utility beam of an awning fixture of said RV.

* * * * *